US007644050B2

(12) United States Patent
Berg et al.

(10) Patent No.: US 7,644,050 B2
(45) Date of Patent: Jan. 5, 2010

(54) METHOD AND APPARATUS FOR ANNOTATION-BASED BEHAVIOR EXTENSIONS

(75) Inventors: Daniel Christopher Berg, Cary, NC (US); Narinder Makin, Morrisville, NC (US); Lawrence Scott Rich, Cary, NC (US); Ritchard Leonard Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 11/002,833

(22) Filed: Dec. 2, 2004

(65) Prior Publication Data

US 2006/0123017 A1  Jun. 8, 2006

(51) Int. Cl.
*G06E 1/00* (2006.01)
*G06E 3/00* (2006.01)
(52) U.S. Cl. .................... 706/18; 703/19; 707/3
(58) Field of Classification Search ............. 707/100, 707/200, 102; 704/8; 383/154
See application file for complete search history.

(56) References Cited

U.S. PATENT DOCUMENTS

| 5,446,886 | A | 8/1995 | Li |
| 5,721,900 | A | 2/1998 | Banning et al. |
| 6,341,277 | B1 | 1/2002 | Coden et al. |
| 6,574,639 | B2 | 6/2003 | Carey et al. |
| 6,609,123 | B1 | 8/2003 | Cazemier et al. |
| 6,618,732 | B1 | 9/2003 | White et al. |
| 6,690,820 | B2 * | 2/2004 | Lees et al. .................. 382/154 |
| 6,850,927 | B1 | 2/2005 | Hsu |
| 6,957,214 | B2 | 10/2005 | Silberberg et al. |
| 7,222,333 | B1 | 5/2007 | Mor et al. |
| 2003/0046673 | A1 * | 3/2003 | Copeland et al. ............ 717/163 |
| 2004/0015506 | A1 | 1/2004 | Anonsen et al. |
| 2005/0066338 | A1 * | 3/2005 | Bloesch et al. .............. 719/328 |
| 2006/0061595 | A1 * | 3/2006 | Goede et al. ................. 345/619 |
| 2007/0192336 | A1 | 8/2007 | Iyer et al. |

OTHER PUBLICATIONS

Beatty et al., "Service Data Objects", IBM Corp. and BEA Systems, Inc., Version 1.0, Nov. 2003, pp. 1-39.
Berg et al., Method and Apparatus for Incrementally Processing Program Annotations, Dec. 2, 2004.
Berg et al., Mechanism for Defining Queries in Terms of Data Objects, Dec. 2, 2004.
Berg et al., Method and Apparatus for Generating a Service Data Object Based Service Pattern for an Enterprise Java Beans Model, Dec. 2, 2004.

* cited by examiner

*Primary Examiner*—David R Vincent
*Assistant Examiner*—Kalpana Bharadwaj
(74) *Attorney, Agent, or Firm*—Jeanine Ray-Yarletts, Esq.; Steven M. Greenberg, Esq.; Carey, Rodriguez, Greenberg & Paul, LLP

(57) ABSTRACT

A method and apparatus is provided for annotation-based behavior extensions. A primary contributor is identified based on a first attribute. Behaviors from a secondary contributor are linked to the primary contributor once a second attribute is examined. Finally, one or more files are generated using the linked behaviors from the primary and secondary contributors.

10 Claims, 6 Drawing Sheets

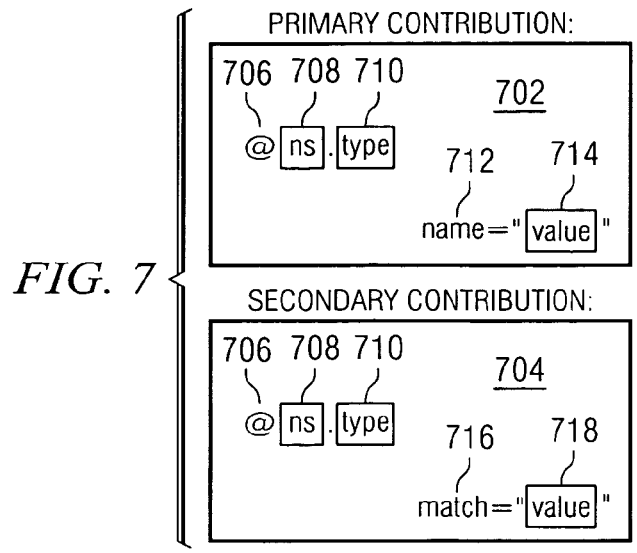

The primary annotation is defined in one of the Container Managed Persistence Entity Bean (CMP) resource, say 'RegistrationBean.java'.
RegistrationBean.java
/**
 * @ws.sdo.value-object
 *     name="Registration"
 * @ws.sbf.session-facade
 *     name="ServiceFacade"
 *     jndi-name="ejb/sample/ServiceFacade"
 *     view-type="remote"
 *     value-objects="Registration"
 */
public class RegistrationBean {
...
}

FIG. 8B

The secondary contributions are defined in the contributing CMP resource, say 'AddressBean.java'
AddressBean.java
/**
 * @ws.sdo.value-object
 *     name="Address"
 * @ws.sbf.session-facade
 *     match="ServiceFacade"
 *     value-objects="Address"
 */
public class AddressBean {
...
}

FIG. 9

The generated Session Bean resource, say 'ServiceFacadeBean.java', that contains CRUD method(s) for Registration and Address value-objects.

ServiceFacadeBean.java

```
public class ServiceFacadeBean implements SessionBean
{
//Contributions for 'Registration':
    public Registration[] getAllRegistrationObjects() throws FindException {...}
    public Registration getRegistrationByKey(RegistrationKey primaryKey) throws Find Exception {...}
    public void createRegistration(Registration data) throws CreateException {...}   ~904
    public void updateRegistration(Registration data) throws UpdateException {...}   ~906
    public void deleteRegistration(Registration data) throws DeleteException {...}   ~908
    public RegistrationRoot getRegistrationRoot() throws FindException {...}
    public void applyRegistrationRootChanges(RegistrationRoot root) throws
    ApplyRootChangesFailedException {...}
//Contributions for 'Address':
    public Address[] getAllAddressObjects() throws FindException {...}
    public Address getAddressByKey(AddressKey primaryKey) throws FindException {...}
    public void createAddress(Address data) throws CreateException {...}   ~910
    public void updateAddress(Address data) throws UpdateException {...}   ~912
    public void deleteAddress(Address data) throws DeleteException {...}   ~914
    public AddressRoot getAddressRoot() throws FindException {...}
    public void applyAddressRootChanges(AddressRoot root) throws ApplyRootChangesFailedException
    {...}
//Contributions for Registration and Address
        private MediatorMetaDataCache mediatorCache = new MediatorMetaDataCache() {
   916 ~    protected MediatorMetaData createMediatorMetaData(EClassifier type) {
                switch (type.getClassifierID()) {
                //Contribution for Registration
                case SdoPackage.REGISTRATION_ROOT:
                    return createRegistrationRootMediatorMetaData();   ~918
                //Contribution for Address
                case SdoPackage.ADDRESS_ROOT:
                    return createAddressRootMediatorMetaData();   ~920
                }
                return null;
            }
        };
}
```

METHOD AND APPARATUS FOR ANNOTATION-BASED BEHAVIOR EXTENSIONS

CROSS REFERENCE TO RELATED APPLICATIONS

The present invention is related to the following applications: Method and Apparatus for Incrementally Processing Program Annotations, Ser. No. 11/002,845, filed on Dec. 2, 2004; Mechanism for Defining Queries in Terms of Data Objects Background of the Invention, Ser. No. 11/002,740, filed on Dec. 2, 2004; and Method and System for Generating an SDO Based Service Pattern for an EJB Model, Ser. No. 11/001,864, filed on Dec. 2, 2004. All of the above related applications are assigned to the same assignee, and incorporated herein by reference.

BACKGROUND OF THE INVENTION

1. Technical Field

The present invention relates to an improved data processing system. In particular, the present invention relates to contributing resources of program annotations in a data processing system. Still more particularly, the present invention relates to extending annotation-based behavior to multiple annotation resources.

2. Description of Related Art

In modern development environments, programmers may use annotations declared in a source program to generate auxiliary artifacts or files that perform services. Many common artifacts, including home and remote interfaces and deployment descriptors of an enterprise Java™ Bean, can be automatically generated by an integrated development environment (IDE), a deployment tool, or a batch script using annotations.

In most development environments, an annotation is a comment declared in a source program that is preceded with a '@' symbol. By using annotations, meta-data may be associated with program elements such as classes, methods, fields, parameters, local variables, and packages. For some programming languages, annotations are compiled and the metadata is stored in the class files. For other programming languages, annotations are interpreted and processed by an annotation processor. Later, the virtual machine or other programs can look for the metadata to determine how to interact with the program elements or change their behavior.

Currently, existing development tools that support annotation processing and artifacts generation, such as Ant, an open source product available from Apache Software Foundation, and XDoclet, an open source product available from the XDoclet team of the Apache Software Foundation, requires annotations to be self contained in a contributing resource from which the generated code is derived. This means that generally only one source file may be used for generation of one or more distinct compatible source files. However, there are a few exceptions, for example, using the XDoclet enterprise JavaBeans™ tag specification to support generation of enterprise Java™ beans, many source files contribute metadata to the "ejb-jar.xml" deployment descriptor file. The J2EE enterprise JavaBeans™ specification is a product available from Sun Microsystems, Inc. The XDoclet enterprise JavaBeans™ tag specification specifies the 'ejb' annotation tagset that may be use to generate enterprise Java™ beans.

In this case, the output file is well known, static, and not arbitrarily or dynamically declared by the contributing files. Moreover, its name and structure are predefined and not extensible. In other words, one or more distinct source files are generated from the annotations in each annotated source file, and the meta-data from all annotated source files is combined into the deployment descriptor file.

In a common tag specification, an annotation in a source file may describe a generated file and subsequent annotations within the same source file may contribute behavior to this generated file. However, annotations from other source files may not be used to contribute behavior to this generated file.

Thus, current annotation-based models are limited to a single annotated source file for behavior contributions of a given generated file. This causes an explosion in the number of generated files, since a source file may contribute behavior to one or more generated files, but only one source file may be used to generate each generated file. This explosion leads to a complex application architecture devoid of logically partitioning or grouping of behavior in the generated files, driven by a higher number of generated files. All of which is undesirable by developers.

Therefore, it would be advantageous to have an improved method and apparatus that allows annotation-based behavior to be contributed from multiple annotated source files into a single set of generated related files, such that the behavior of the generated output can be more appropriately partitioned based on the business model, and potentially reducing the number of generated files, in order to provide a more flexible application architecture.

BRIEF SUMMARY OF THE INVENTION

A method, apparatus and computer instructions is provided for annotation-based behavior extensions. The mechanism of the present invention allows behaviors to be contributed from annotations in multiple source files into a single output file or a set of related output files. The names and locations of the output files are dynamically derived from the values specified in the annotations. The mechanism of the present invention allows for the identification of a primary contributor based on a first attribute in a first source file and examines a secondary contributor of a second attribute in a second source file. If the value of the first attribute matches the value of the second attribute, the mechanism of the present invention generates one or more files with linked behaviors from the primary contributor and the secondary contributor.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram illustrating the structure of extendible behavior annotations in accordance with a preferred embodiment of the present invention;

FIG. 8A is an exemplary implementation of a primary contributor in accordance with a preferred embodiment of the present invention;

FIG. 8B is a diagram illustrating an exemplary implementation of a secondary contributor in accordance with a preferred embodiment of the present invention;

FIG. 9 is a diagram illustrating an exemplary generated output file in accordance with a preferred embodiment of the present invention.

DETAILED DESCRIPTION OF THE INVENTION

Figure 1:
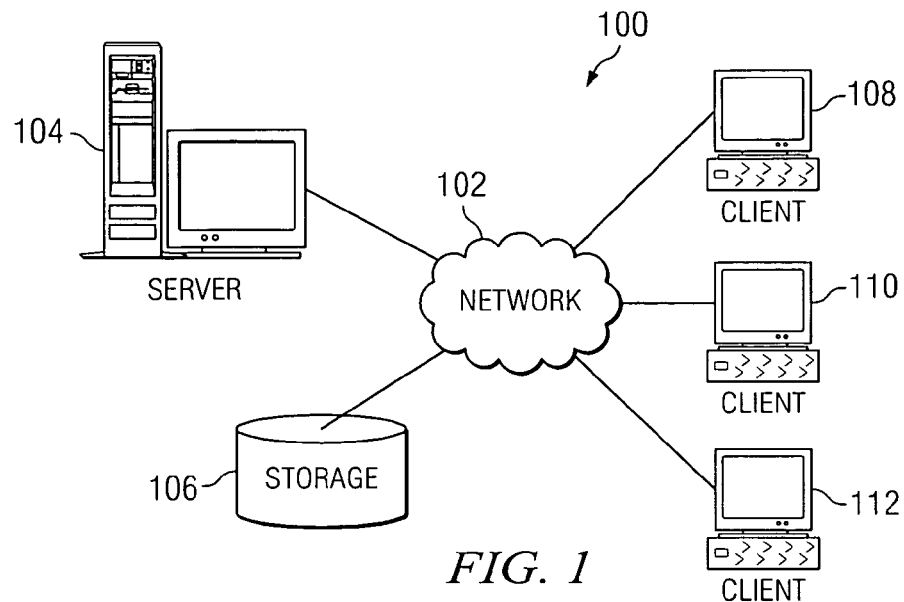
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
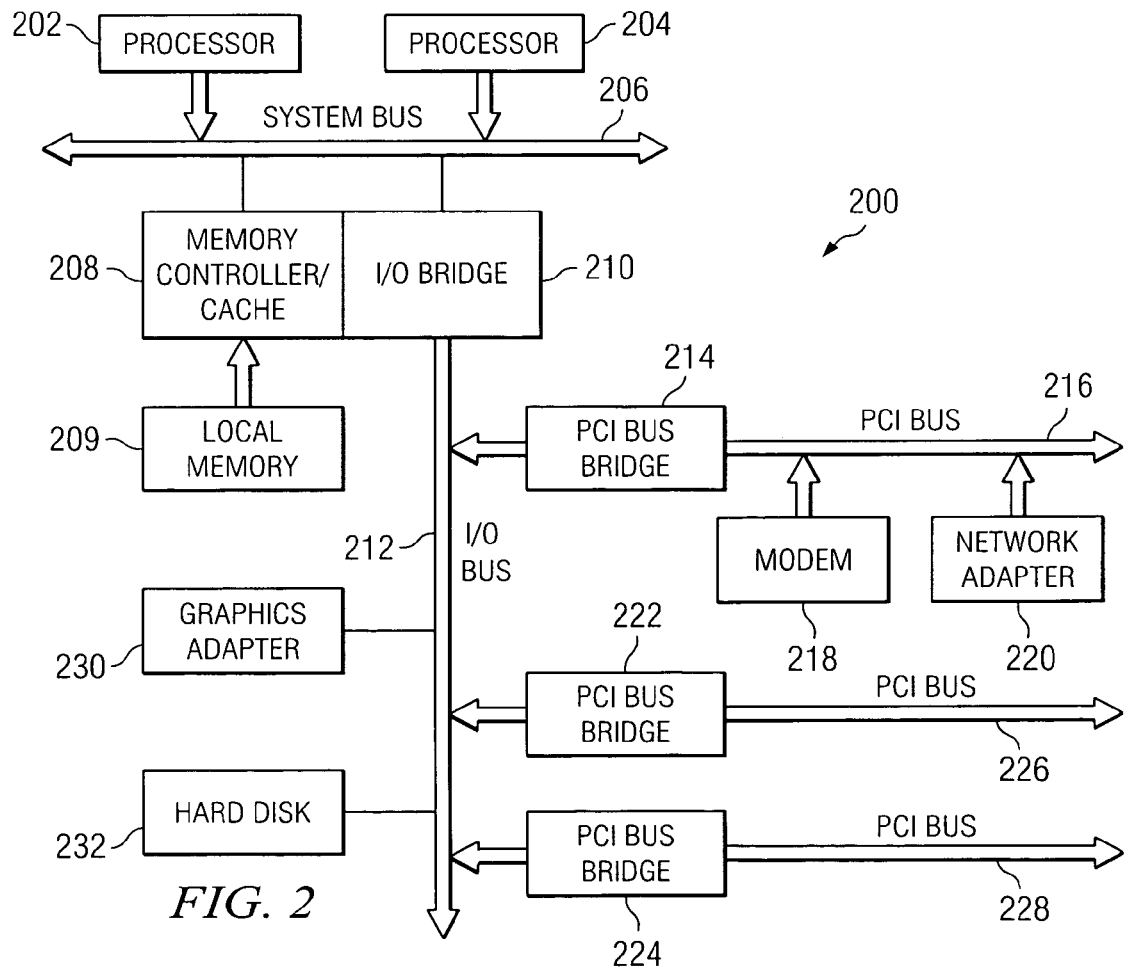
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
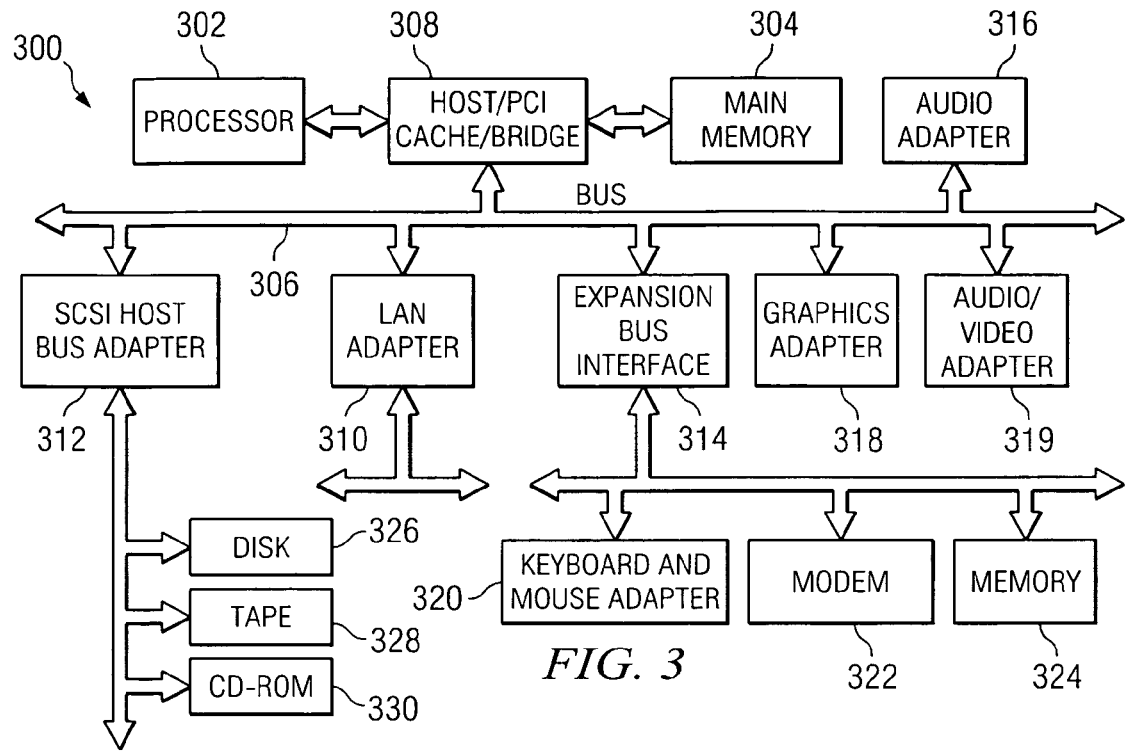
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for annotation-based behavior extensions. For a given tag specification, the mechanism of the present invention identifies a primary contributor. A primary contributor is an annotation in a given source file that has a 'name' attribute. However, an attribute other than 'name' may also be used to identify the annotation. The 'name' attribute uniquely identifies that specific annotation contribution across the entire module. A module is a collection of related source files that compose an application, for example, the enterprise JavaBeans™ specification includes a collection of source files related to an "ejb module", contained within an application defined by the Java™ 2 enterprise edition specification.

Using the mechanism of the present invention, behavior contributions to the primary contributor may be specified by other annotations defined in the same source file or other source files. The present invention links behavior contributions from other source files by matching the values of a 'match' attribute in annotations of the other source files with the value of the 'name' attribute of the primary contributor. The use of the attribute name 'match' is arbitrary and an attribute with a name other than 'match' may also be used to link the behavior contribution back to the primary contributor. The annotation with the 'match' attribute may reside in the same source file, a different source file, or in multiple source files.

For example, a 'name' attribute with a value of 'Service-Facade' is defined in a primary contributor named 'session-facade'. When an annotation with the same tag name in a different source file is encountered, the mechanism of the present invention determines whether the value of its 'match' attribute matches the value of the 'name' attribute. In this example, the mechanism of the present invention determines if the 'match' attribute also has a value of 'ServiceFacade'.

If the value matches, this annotation is identified as a secondary contributor and the mechanism of the present invention links the behavior contribution of the secondary contributor to the primary contributor. Thus, when annotations are processed, the single generated file or the set of generated related files not only includes behavior contributed from the primary contributor, but also the behavior of the secondary contributor, which can be an annotation from a different source file.

Behavior of the secondary contributor includes metadata resulting in the generation of fields, operations, classes, or other serializable media identified by the secondary contributor. Similarly, additional behavior contributions from other annotations of other source files may be linked to the primary contributor using the 'match' attribute or any other desired attribute. Linking includes behaviors from additional contributions to the primary contributor in generation of one or more output files.

Figure 4A:
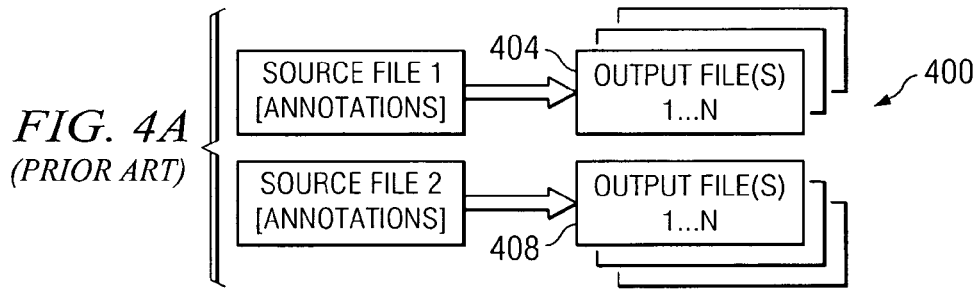
FIG. 4A is a diagram illustrating a known annotation based model.

Turning now to FIG. 4A, a diagram illustrating a known annotation based model. As depicted in FIG. 4A, annotation-based model 400 may be implemented in a data processing system, such as data processing system 200 in FIG. 2 and data processing system 300 in FIG. 3.

In annotation-based model 400, one or more annotations may be defined in source file 1, since annotations may exist in different levels of source file 1. The attributes in each of these annotations contains meta information that is used to derive or generate a set of output files, output files 1 to N 404.

Similarly, annotations defined in source file 2 may be used to generate a second set of output files, output files 1 to N 408. As shown in FIG. 4A, the source-to-output file relationship is a one-to-many relationship, meaning one source file may contribute behaviors to one or more output files within the same set.

However, source file 1 may not contribute to generation of the second set of output files 408 and source file 2 may not contribute to the generation of the first set of output files 404. This limitation restricts the flexibility of the architecture and can result in a large number of output files, since contribution of each output file is limited to a single source file.

Figure 4B:
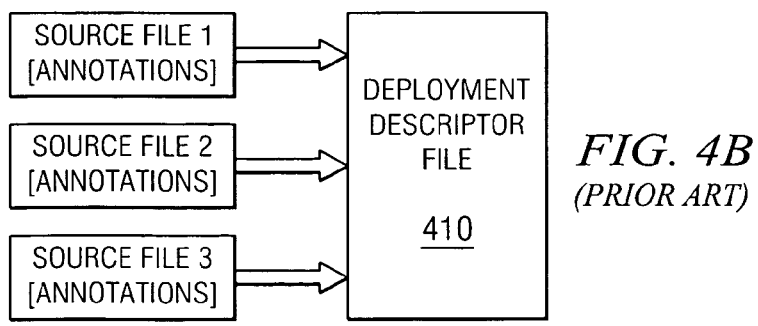
FIG. 4B is a diagram illustrating known contributions of source files.

Turning now to FIG. 4B, a diagram illustrating known contributions of source files. As shown in FIG. 4B, in tag specification, such as the XDoclet enterprise JavaBean™ specification, multiple source files may contribute meta-data to a deployment descriptor file 410. The J2EE enterprise JavaBeans™ specification is a product available from Sun Microsystems, Inc. XDoclet implements a tag specification that processes annotations to generate files in accordance with the J2EE enterprise JavaBeans™ specification. Thus, XDoclet specifies the 'ejb' annotation tagset that can be used to generate enterprise Java™ beans.

In this example, source file 1, source file 2, and source file 3 all contribute meta-data to deployment descriptor file 410. An example of a deployment descriptor file 410 is 'ejb-jar.xml' file in the enterprise JavaBean™ specification. The enterprise JavaBean™ specification and the Java™ 2 enterprise edition specification are products available from Sun Microsystems, Inc.

However, deployment descriptor file 410 is typically defined in a well known or static location as defined by the specification. In other words, the name and structure of the deployment description file 410 are predefined and are not extensible. Thus, each of the source files contributes to the deployment descriptor file, but not to defined output files that are shared dynamically.

Figure 5:
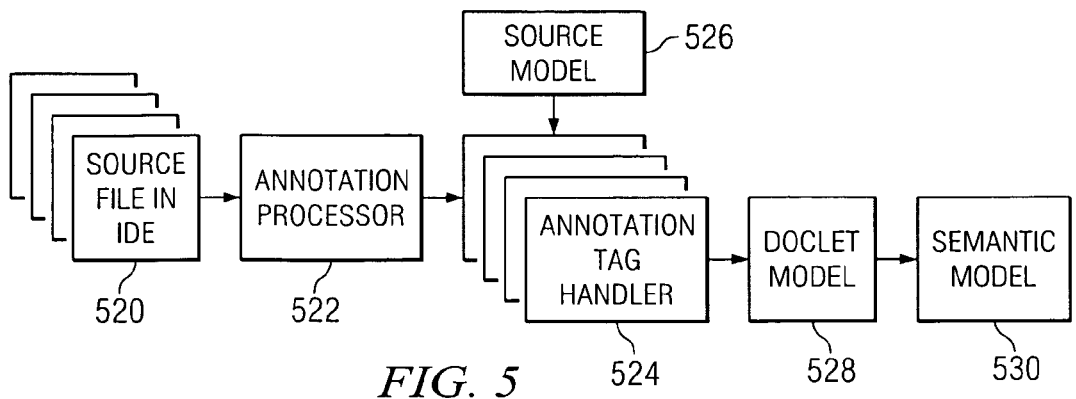
FIG. 5 is a diagram illustrating components of the present invention is depicted in accordance with a preferred embodiment of the present invention.

Turning now to FIG. 5, a diagram illustrating components of the present invention is depicted in accordance with a preferred embodiment of the present invention. As shown in FIG. 5, in this example implementation, one or more source files 520 may be defined in an integrated development environment (IDE), such as Rational Application Developer, a product available from International Business Machines Corporation. The integrated development environment may be implemented in a data processing system, such as data processing system 200 in FIG. 2 or data processing system 300 in FIG. 3.

Within each source file, annotations may be defined to specify artifacts or behaviors to be generated at run time. When a user initiates a build in the IDE, annotation processor 522 processes source files 520 by parsing the annotations within a changed source file and calls registered annotation tag handlers 524 based on the namespace of the annotations. Each of the registered annotation tag handlers 524 corresponds to a particular namespace or tag set.

When annotation tag handler 524 receives a request to process changes, it initiates recording of changes using an annotation change recorder. Annotation tag handler 524 then retrieves or creates a modeled source element, such as a source type, field, or method, in source model 526. Source model 526 represents actual Java™ types, fields or methods.

Annotation tag handler 524 also creates or updates doclet model object in doclet model 528 for the given annotation tag and associates the doclet model object with the modeled source element. Doclet model 528 includes doclet objects that are either created or updated by annotation tag handlers 526 during processing of annotations. Doclet objects represent valid annotation tags and associated attributes for a type, field, or method of a given namespace.

Once all changed source files are processed, annotation tag handler 526 notifies the annotation change recorder to stop recording and determines if any changes are made to doclet model 528. If changes are made, annotation tag handler 526 invokes an annotation model transformer to transform each added, removed, and changed doclet object into semantic model 530. The transformation is performed using a content model handler, which iterates each added, removed, and changed doclet object and records the changes to semantic objects in semantic model 530 accordingly.

Figure 6:
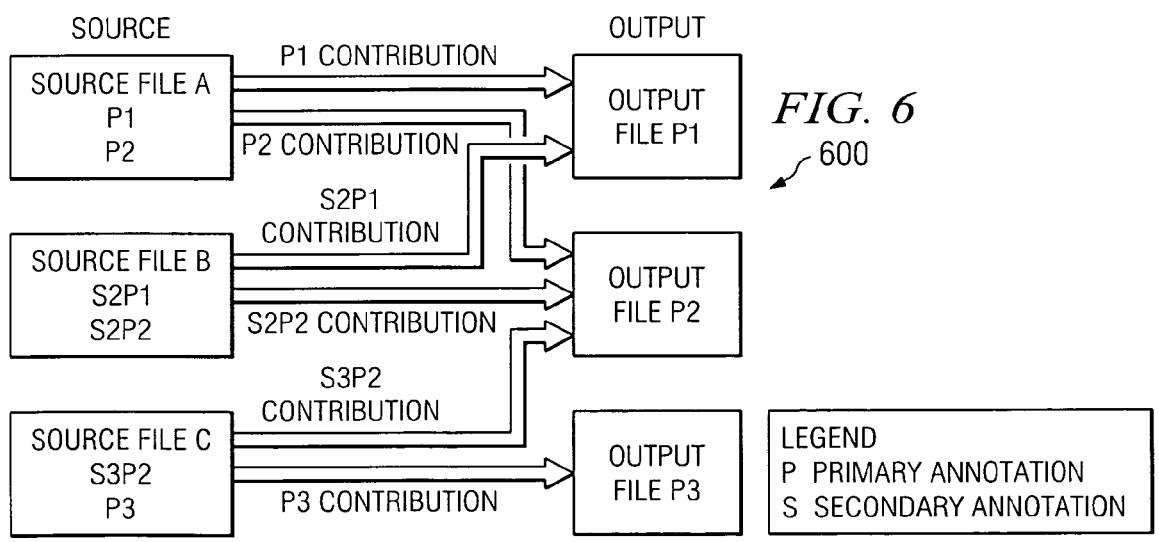
FIG. 6 is a diagram illustrating an exemplary annotated based model for source file contributions to generated artifacts, in accordance with a preferred embodiment of the present invention.

Turning now to FIG. 6, a diagram illustrating an exemplary annotation based model for source file contributions to generated artifacts is depicted in accordance with a preferred embodiment of the present invention. As depicted in FIG. 6, annotation-based model 600 may also be implemented in a data processing system, such as data processing system 200 in FIG. 2 and data processing system 300 in FIG. 3.

Using the mechanism of the present invention, such as element 522 and 524 in FIG. 5, one or more source files may contribute to one or more output files. Thus, no limit in the number of source files is present from which an output file may be contributed. In addition, no limit in the number of output files is present to which a source file may contribute.

As shown in the example illustrated in FIG. 6, source file A includes two annotations: annotation P1, and annotation P2. Annotation P1 contributes behavior to output file P1 and annotation P2 contributes behavior to output file P2. Thus, each annotation in source file A contributes to a different output file. Each output file must have exactly one primary contribution. In this example, annotations P1 and P2 are primary contributions to output files P1 and P2, respectively.

Also shown in FIG. 6, source file B has two annotations: annotations S2P1 and S2P2. Similar to annotations P1 and P2, S2P1 and S2P2 contribute behaviors to output files P1 and P2, respectively. Annotations S2P1 and S2P2 are secondary contributions to output files P1 and P2, respectively. Thus, output file P1 now has two contributions, a primary contribution from annotation P1 and a secondary contribution from annotation S2P1.

However, unlike output file P1, output file P2 has a third contribution, annotation S3P2 in source file C. Annotation S3P2 is the tertiary contribution to output file P2. In addition to annotation S3P2, source file C includes annotation P3, which is the only contribution to output file P3. Hence, annotation P3 is the primary contribution to output file P3.

The examples in FIG. 6 illustrate an unlimited number of combinations between source and output files may be present. An output file is not limited to contributions from a single file, as it was in the prior art. Multiple source files may contribute to a single output file. Thus, the source-to-output file relationship is now a many-to-many relationship.

Turning now to FIG. 7, a diagram illustrating the structure of extendible annotations is depicted in accordance with a preferred embodiment of the present invention. As depicted in FIG. 7, in this example implementation, annotations 702 and 704 are denoted by a '@' symbol 706. However, other symbol, tags, or identifiers may be used to denote annotations 702 and 704. In addition, annotations 702 and 704 include a namespace 708 and a type 710. Namespace defines a tag set for the annotation. A tag set includes a set of related tags. By using a namespace, the name collision of tag names may be avoided. An example of a namespace includes 'ejb', which defines a set of tags related to enterprise Java beans.

Type 710 defines a tag name for the annotation. The tag name is unique for a particular namespace, but may not be unique across different namespaces. For example, the 'ejb' namespace may include a 'home' type, which defines a home interface for the enterprise Java bean.

In this example, annotation 702 is a primary contributor. Primary contributor 702 defines the basis for artifact or file generation. It includes a 'name' attribute 712, which is a named attribute that uniquely identifies an instance of annotation 702 across the entire module. The 'name' attribute 712 provides a key for other contributions to reference annotation 702 by its name. Value 714 defines a unique value for 'name' attribute 712. An example 'value' may be 'ServiceFacade'.

Annotation 704 is a secondary contributor. Annotation 704 defines additional state and behavior to be appended to the generated artifacts or files. Instead of a 'name' attribute, secondary contributor 704 includes 'match' attribute 716, which is a named attribute used to reference primary contributor 702.

In order to link the behavior of secondary contributor 704 to primary contributor 702, value 718 of 'match' attribute 716 matches the unique value 714 of key 'name' attribute 712 of primary contributor 702. From the above example, value 718 must be 'ServiceFacade'.

Turning now to FIG. 8A, an exemplary implementation of a primary contributor is depicted in accordance with a preferred embodiment of the present invention. As depicted in FIG. 8A, in this example implementation, RegistrationBean.java 802 is one of the container managed persistence entity bean resources.

RegistrationBean.java 802 includes annotation 804, which has a namespace of 'ws.sbf' and a type of 'session-facade'. In addition, annotation 804 includes a 'name' attribute with a value of 'ServiceFacade'. Annotation 804 also includes a 'value-objects' attribute with a value of 'Registration', which indicates that the "Registration" value object is to be managed by the generated artifact, such as the ServiceFacade bean. Turning now to FIG. 8B, a diagram illustrating an exemplary implementation of a secondary contributor is depicted in accordance with a preferred embodiment of the present invention. As depicted in FIG. 8B, in this example implementation, AddressBean.java 820 is a contributing container managed persistent entity bean resource.

AddressBean.java 820 includes annotation 822, which also has a namespace of 'ws.sbf' and a type of 'session-facade'. In addition, annotation 822 includes a 'match' attribute with a value of 'ServiceFacade'. Annotation 822 also includes a 'value-objects' attribute with a value of 'Address', which indicates that the "Address" value object is also to be managed by the same generated facade artifact 'ServiceFacade'.

Thus, when AddressBean.java 820 is processed, the mechanism of the present invention recognizes that the value of 'ServiceFacade' matches the 'name' attribute from primary contributor annotation 804 in FIG. 8A. The mechanism of the present invention then adds the behavior from AddressBean 820 when artifacts or files are generated.

Turning now to FIG. 9, a diagram illustrating an exemplary generated output file is depicted in accordance with a preferred embodiment of the present invention. As depicted in FIG. 9, ServiceFacadeBean.java 900 is a session bean resource that is generated after RegistrationBean.java 802 in FIG. 8A and AddressBean.java 820 in FIG. 8B are processed.

In this example, not only behavior contributions from RegistrationBean.java 802 in FIG. 8A, such as createRegistration 904, updateRegistration 906 and deleteRegistration 908 methods are included, behavior contributions from AddressBean.java 820 in FIG. 8B, including createAddress 910, updateAddress 912 and deleteAddress 914 methods are also included when ServiceFacadeBean.java 900 is generated.

Furthermore, contributions from

RegistrationBean 802 and AddressBean 820 may be interleaved to form a generated method. For example, createMediatorMetaData method 916 is formed with createRegistrationRootMediatorMetaData method 918 from RegistrationBean 802 in FIG. 8A and createAddressRootMediatorMetaData method 920 from AddressBean 820 in FIG. 8B.

Figure 10:
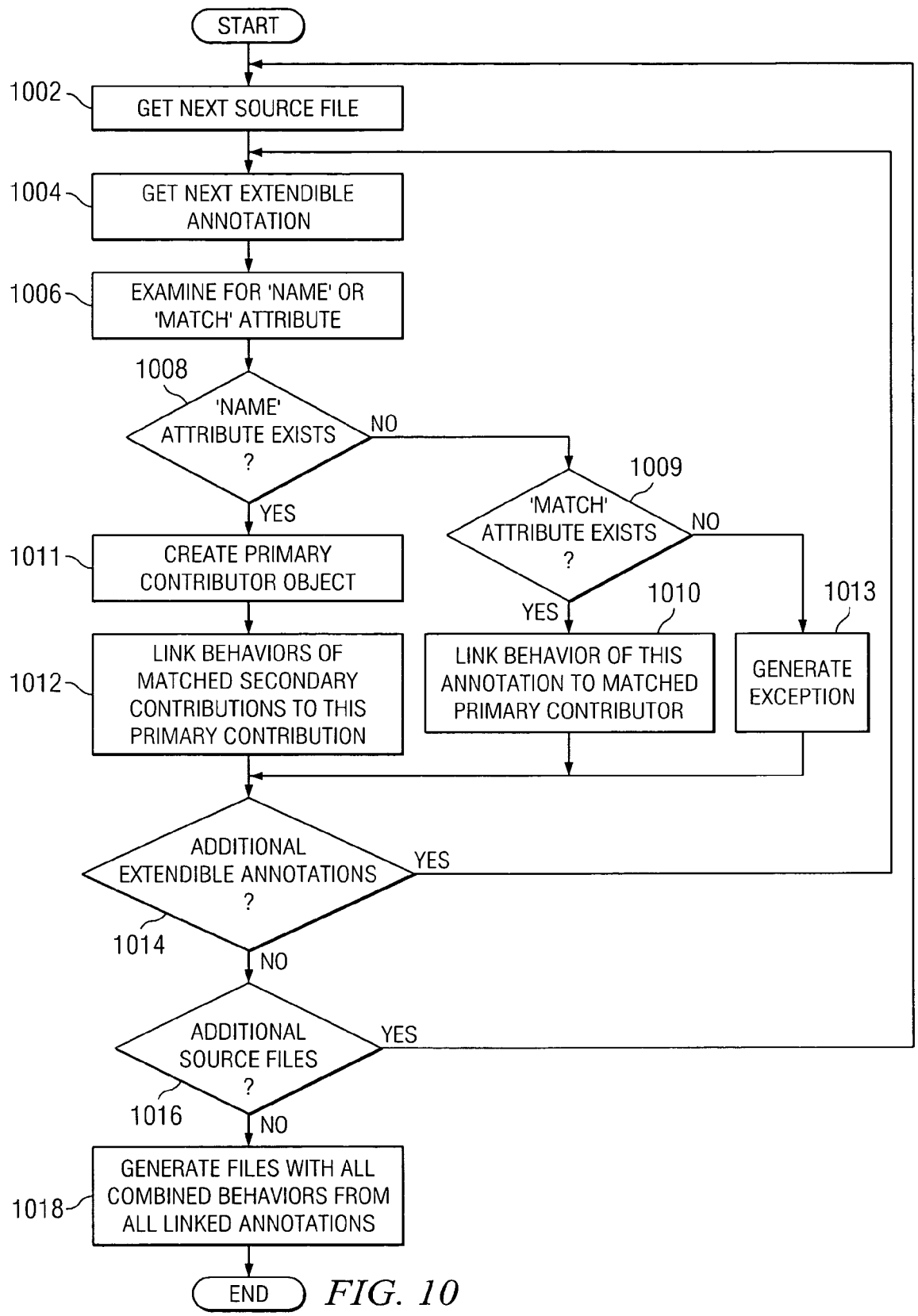
FIG. 10 is an exemplary flowchart of a process for annotation-based extension in accordance with a preferred embodiment of the present invention.

Turning now to FIG. 10, an exemplary flowchart of a process for annotation-based extensions is depicted in accordance with a preferred embodiment of the present invention. This process is implemented by the mechanism of the present invention, including an annotation processor 522 and registered tag handlers 524 for changed annotations in a source file, as described in FIG. 5 above.

As depicted in FIG. 10, the process begins when the next source file is processed (step 1002). The mechanism of the present invention gets the next extendible annotation within the source file (step 1004) and examines for a 'name' or 'match' attribute (step 1006). As mentioned in the related patent application entitled "Method and Apparatus for Incrementally Processing Program Annotations," filed even date hereof, and incorporated by reference above, validations may be performed to determine if an annotation includes a 'name' or a 'match' attribute.

Next, a determination is made by the mechanism of the present invention as to whether a 'name' attribute exists (step 1008). If a 'name' attribute exists, the mechanism of the present invention creates a primary contributor object (step 1011) and links the behavior of matched secondary contributions to this primary contribution object (step 1012). The process then continues to step 1014.

However, if a 'name' attribute does not exist, the mechanism of the present invention determines if a 'match' attribute exists (step 1009). If a 'match' attribute exists, the mechanism of the present invention links behavior of this annotation to the primary contribution object (step 1010) and the process continues to step 1014. Otherwise, the mechanism of the present invention generates exceptions (step 1013) and the process continues to step 1014.

At step 1014, a determination is made by the mechanism of the present invention as to whether additional extendible annotations exist in this source file. If additional extendible annotations exist in this source file, the process returns to step 1004 to retrieve the next extendible annotation in this source file. Otherwise, the mechanism of the present invention determines as to whether additional source files exist (step 1016).

If additional source files exist, the process returns to step 1002 to retrieve the next source file. Otherwise, artifacts or files are generated with all behaviors combined from all linked annotations (step 1018). Thus, the process terminates thereafter.

In summary, the present invention allows behavior to be contributed from multiple source files into a single output file or a set of related output files. The mechanism of the present invention matches the value of a 'name' attribute of an annotation in a source file against the value of a 'match' attribute of an annotation in another source file to determine whether behaviors should be included from a secondary contributor when generating artifacts. In this way, the limitation of a single annotated source file is eliminated and a more flexible application architecture may be constructed without this limitation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for annotation-based behavior extensions to files of a composed application generated from source code in a programming system, the data processing system having a data processor and memory, and further comprising:

an integrated development environment (IDE) executing in a data processing system and an annotation processor couple to the IDE;

a first annotation in source code in a first source code file loaded in the IDE, the first annotation specifying a macro in respect to at least a portion of the source code in the first source code file, the first annotation including a naming attribute;

a second annotation in source code in a second source code file loaded in the IDE, the second annotation specifying a macro in respect to at least a portion of the source code in the second source code file, the second annotation including a naming attribute; and an output file generated by the annotation processor in connection with the IDE from both the first annotation of the first source code file and the second annotation of the second source code file responsive to a matching of the naming attribute of the first annotation with the naming attribute of the second annotation.

2. The data processing system of claim 1, wherein the output file comprises linked behaviors that include metadata resulting in generation of fields, operations, classes, and other serializable media identified by the second annotation.

3. A method for annotation-based behavior extension comprising:

identifying a first annotation in source code in a first source code file loaded in an integrate development environment (IDE), the first annotation specifying a macro in respect to at least a portion of the source code in the first source code file, the first annotation including a naming attribute;

examining a second annotation in source code in a second source code file loaded in the IDE, the second annotation specifying a macro in respect to at least a portion of the source code in the second source code file, the second annotation including a naming attribute;

matching the naming attribute of the first annotation to the second annotation and linking behaviors from the second annotation to the first annotation; and generating an output files with the linked behaviors.

4. A computer program product comprising:

A recordable-type medium having computer readable instructions for annotation-based behavior extension, wherein the behavior extension is a plurality of behavior contributions provided by a plurality of contributors, the computer program product including:

first instructions for identifying a first annotation in source code in a first source code file, the first annotation specifying a macro in respect to at least a portion of the source code in the first source code file, the first annotation including a naming attribute;

second instructions for examining a second annotation in source code in a second source code file, the second annotation specifying a macro in respect to at least a portion of the source code in the second source code file, the second annotation including a naming attribute;

third instructions for matching the naming attribute of the first annotation to the second annotation and linking behaviors from the second annotation to the first annotation; and fourth instructions for generated an output files with the linked behaviors.

5. The data processing system of claim 1, wherein the first annotation comprises a first comment declared in the first source program file and the at least one second annotation comprises at least one second comment declared in the second source program file.

6. The data processing system of claim 5 wherein the first comment and the at least one second comment are declared using an"@" symbol.

7. The method of claim 3 wherein the first annotation comprises a first comment declared in the first source code file and the at least one second annotation comprises at least one second comment declared in the second source code file.

8. The method of claim 7 wherein the first comment and the at least one second comment are declared using an "@" symbol.

9. The computer program product of claim 4 wherein the first annotation comprises a first comment declared in the first source code file and the at least one second annotation comprises at least one second comment declared in the second source code file.

10. The computer program product of claim 9 wherein the first comment and the at least one second comment are declared using an "@" symbol.

* * * * *

UNITED STATES PATENT AND TRADEMARK OFFICE
CERTIFICATE OF CORRECTION

PATENT NO. : 7,644,050 B2　　　　　　　　　　　　　　　　　　　Page 1 of 1
APPLICATION NO. : 11/002833
DATED : January 5, 2010
INVENTOR(S) : Berg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Sixteenth Day of November, 2010

David J. Kappos
*Director of the United States Patent and Trademark Office*